US012066779B2

(12) United States Patent
Ohashi et al.

(10) Patent No.: US 12,066,779 B2
(45) Date of Patent: Aug. 20, 2024

(54) FIXING DEVICE AND IMAGE FORMING APPARATUS

(71) Applicant: FUJIFILM Business Innovation Corp., Tokyo (JP)

(72) Inventors: Takashi Ohashi, Kanagawa (JP); Takashi Matsubara, Kanagawa (JP); Takuma Ishihara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/895,014

(22) Filed: Aug. 24, 2022

(65) Prior Publication Data

US 2023/0305459 A1 Sep. 28, 2023

(30) Foreign Application Priority Data

Mar. 25, 2022 (JP) ................................ 2022-049938

(51) Int. Cl.
*G03G 15/20* (2006.01)

(52) U.S. Cl.
CPC ................................ *G03G 15/2053* (2013.01)

(58) Field of Classification Search
CPC ........... G03G 15/2017; G03G 15/2053; G03G 2215/2003
See application file for complete search history.

(56) References Cited

U.S. PATENT DOCUMENTS 4,792,680 A * 12/1988 Lang .................. G03G 15/0291 361/230
2003/0147680 A1* 8/2003 Kawamura ........ G03G 15/2057 399/329

FOREIGN PATENT DOCUMENTS

JP H09114315 5/1997

* cited by examiner

*Primary Examiner* — Thomas S Giampaolo, II
(74) *Attorney, Agent, or Firm* — JCIPRNET

(57) ABSTRACT

A fixing device includes a fixation member, a fixing member that has an outer peripheral surface and an inner peripheral surface, is rotatably provided with respect to the fixation member, comes into contact with, of a recording material on which an image is formed, a surface on which the image is formed, and fixes the image to the recording material, a rotating member that includes a contact surface, which is in contact with the inner peripheral surface of the fixing member, at an outer peripheral portion, includes a heat generating portion generating heat due to electric resistance, and is rotatable together with the heat generating portion with respect to the fixation member, and a power receiving member that includes a power receiving surface receiving power from the fixation member with a peripheral surface, has a spring characteristic of biasing the power receiving surface in a direction of the fixation member, and rotates together with the rotating member.

8 Claims, 6 Drawing Sheets

FIXING DEVICE AND IMAGE FORMING APPARATUS

CROSS-REFERENCE TO RELATED APPLICATIONS

This application is based on and claims priority under 35 USC 119 from Japanese Patent Application No. 2022-049938 filed Mar. 25, 2022.

BACKGROUND

(i) Technical Field

The present invention relates to a fixing device and an image forming apparatus.

(ii) Related Art

For example, JP1997-114315A discloses a configuration where a pair of conductive power receiving members are fitted to inner peripheral surface portions of both ends of a resistance heating generating body layer formed at an inner peripheral surface of a core roller in a fixing device and are fixed to a heating generating body layer and a configuration where a pair of conductive carbon power supplying members are pressed by springs respectively against the power receiving members.

SUMMARY

Herein, in a case where a contact area during supplying power from a fixation member to a rotating member is small, an appliable current value decreases. Thus, for example, although it is preferable to receive power over a relatively wide area, in a case where the contact area is made wide, it may be difficult to maintain a uniform contact pressure and secure stable electrical conduction.

Aspects of non-limiting embodiments of the present disclosure relate to a fixing device and an image forming apparatus that secure stable conduction compared to a case where a power receiving member, which is for a rotating member to receive power from a fixation member, does not have a spring characteristic.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a fixing device includes a fixation member, a fixing member that has an outer peripheral surface and an inner peripheral surface, is rotatably provided with respect to the fixation member, comes into contact with, of a recording material on which an image is formed, a surface on which the image is formed, and fixes the image to the recording material, a rotating member that includes a contact surface, which is in contact with the inner peripheral surface of the fixing member, at an outer peripheral portion, includes a heat generating portion generating heat due to electric resistance, and is rotatable together with the heat generating portion with respect to the fixation member, and a power receiving member that includes a power receiving surface receiving power from the fixation member with a peripheral surface, has a spring characteristic of biasing the power receiving surface in a direction of the fixation member, and rotates together with the rotating member.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the accompanying drawings.

Figure 1:
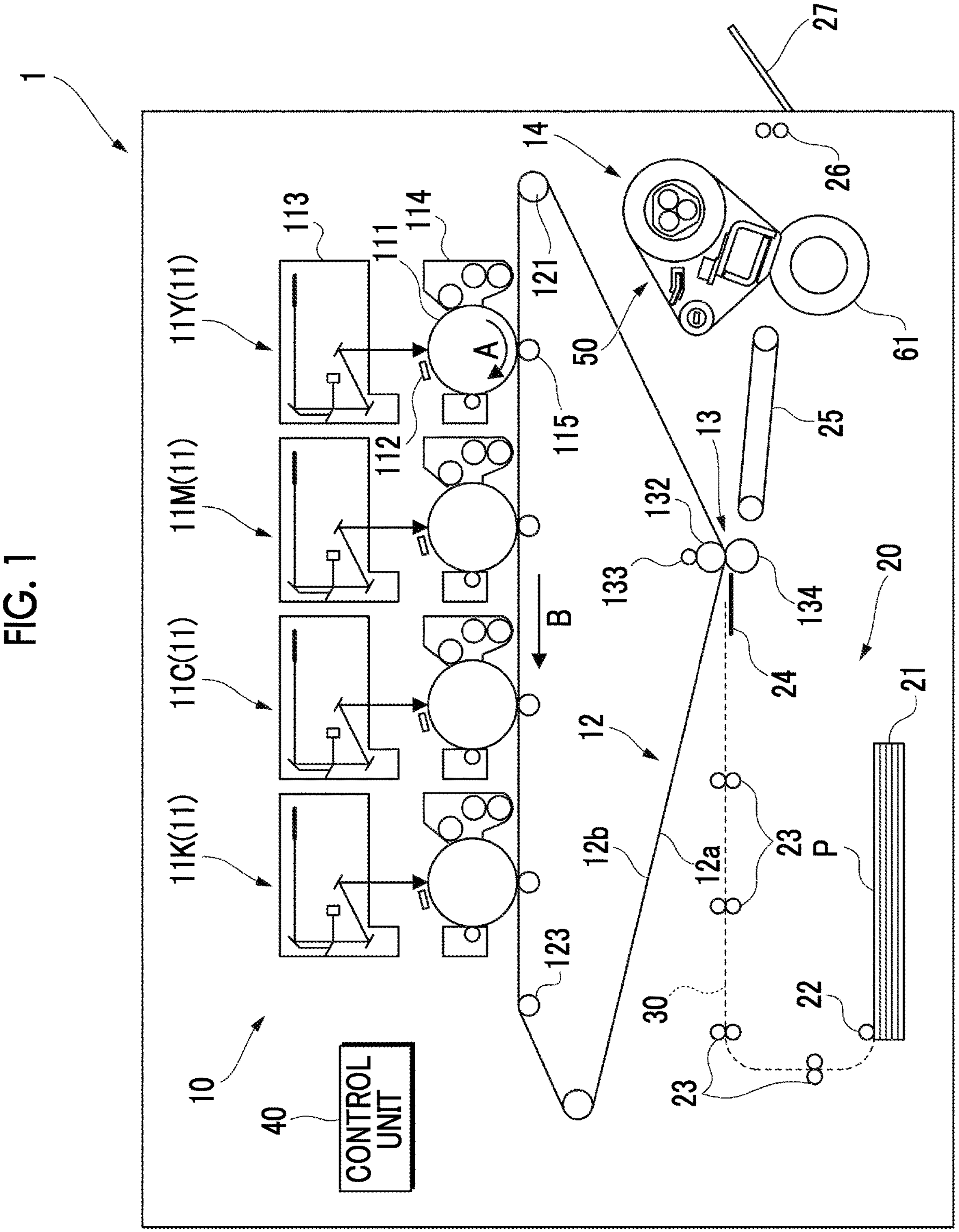
FIG. 1 is a view showing an image forming apparatus according to the present exemplary embodiment.

FIG. 1 is a view showing an image forming apparatus 1 according to the present exemplary embodiment.

The image forming apparatus 1 shown in FIG. 1 is an apparatus forming an image on paper P which is an example of a recording material. The image forming apparatus 1 is provided with an image forming portion 10, a paper transport unit 20, and a control unit 40.

The image forming portion 10 is provided with an image forming unit 11, an intermediate transfer belt 12, a secondary transfer unit 13, and a fixer 14, which is an example of a fixing device.

In the present exemplary embodiment, four image forming units 11Y, 11M, 11C, and 11K corresponding to four colors of toners including yellow (Y), magenta (M), cyan (C), and black (K) respectively are provided as the image forming unit 11.

The image forming units 11Y, 11M, 11C, and 11K are arranged in a moving direction of the intermediate transfer belt 12 and form a toner image through an electrophotographic method.

Each of the image forming units 11Y, 11M, 11C, and 11K has a photoconductor drum 111, a charging unit 112, an exposure unit 113, a developing unit 114, and a primary transfer unit 115.

Each of the image forming units 11Y, 11M, 11C, and 11K forms a toner image of any color of YMCK and transfers a toner image onto the intermediate transfer belt 12. Accordingly, a toner image in which the toner images of respective colors including YMCK overlap each other is formed on the intermediate transfer belt 12.

The photoconductor drum 111 rotates in an arrow A direction at a speed determined in advance. In addition, an electrostatic latent image is formed on a peripheral surface of the photoconductor drum 111.

The charging unit 112 charges the peripheral surface of the photoconductor drum 111 at a potential determined in advance.

The exposure unit 113 irradiates the charged peripheral surface of the photoconductor drum 111 with light and forms an electrostatic latent image on the peripheral surface of the photoconductor drum 111.

The developing unit 114 forms a toner image by attaching a toner to the electrostatic latent image formed on the peripheral surface of the photoconductor drum 111.

The primary transfer unit 115 transfers the toner image formed on the peripheral surface of the photoconductor drum 111 onto the intermediate transfer belt 12.

A voltage having a polarity opposite to a charging polarity of a toner is applied to the primary transfer unit 115. Accordingly, the toner image formed on the peripheral surface of the photoconductor drum 111 is sequentially electrostatically sucked onto the intermediate transfer belt 12 and one overlapping color toner image is formed on the intermediate transfer belt 12.

The intermediate transfer belt 12 is supported by a plurality of roller-shaped members. The intermediate transfer belt 12 is formed in an endless shape and circulates and moves in an arrow B direction. In addition, the intermediate transfer belt 12 includes an outer peripheral surface 12*a* and an inner peripheral surface 12*b*.

The intermediate transfer belt 12 is used in transporting a toner image. In the present exemplary embodiment, a toner image is formed on the outer peripheral surface 12*a* of the intermediate transfer belt 12, and the toner image is transported to the secondary transfer unit 13 with the movement of the intermediate transfer belt 12.

In the present exemplary embodiment, a drive roller 121 that is driven by a motor (not shown) and drives the intermediate transfer belt 12 is provided as the roller-shaped member arranged inside the intermediate transfer belt 12. In addition, an idle roller 123 and a backup roller 132 that support the intermediate transfer belt 12 are provided as the roller-shaped members.

The roller-shaped members are rotatably provided and are pressed against the inner peripheral surface 12*b* of the intermediate transfer belt 12.

The paper transport unit 20 is provided with a paper accommodating unit 21 that accommodates a plurality of sheets of paper P in a stacked state and a pickup roller 22 that takes out and transports the paper P accommodated in the paper accommodating unit 21.

In addition, the paper transport unit 20 is provided with a transport roller 23 that transports the paper P taken out by the pickup roller 22 along a paper transport path 30 and a paper guiding portion 24 that guides the paper P transported by the transport roller 23 to the secondary transfer unit 13.

Further, the paper transport unit 20 is further provided with a transport belt 25 that transports the paper P after secondary transfer to the fixer 14 and a paper guiding portion 26 that guides the paper P after fixing to a discharge portion 27.

The secondary transfer unit 13 is provided with a secondary transfer roller 134 that is arranged to be in contact with the outer peripheral surface 12*a* of the intermediate transfer belt 12 and the backup roller 132 that is arranged on an inner peripheral surface 12*b* side of the intermediate transfer belt 12 and forms an electrode facing the secondary transfer roller 134.

In addition, in the present exemplary embodiment, a power supplying roller 133 made of a metal, which applies a secondary transfer bias to the backup roller 132, is provided.

The secondary transfer unit 13 configured in this manner transfers a toner image transported to the secondary transfer unit 13 by the intermediate transfer belt 12 to the transported paper P.

The fixer 14 is arranged on a downstream side of the secondary transfer unit 13 in a transport direction of the paper P. The fixer 14 is provided with a fixing belt module 50 that has a heating source and a pressurizing roller 61 provided to face the fixing belt module 50.

In a case where the paper P which has passed through the secondary transfer unit 13 is transported between the fixing belt module 50 and the pressurizing roller 61, an unfixed toner image on the paper P is melted and then fixed onto the paper P. Accordingly, an image consisting of the toner image is formed on the paper P.

Herein, a case of adopting a configuration where a heat generating portion is provided at a pressing portion 53 (see FIG. 2) of the fixing belt module 50 of the fixer 14 shown in FIG. 1 and fixing is performed using only heat from such a heat generating portion is considered. In such a case, in development design of the pressing portion 53, for example, it is difficult to improve a nip structure that widens a nip width or easily peels paper after nipping in general as the heat generating structure takes priority over the nip structure.

Figure 2:
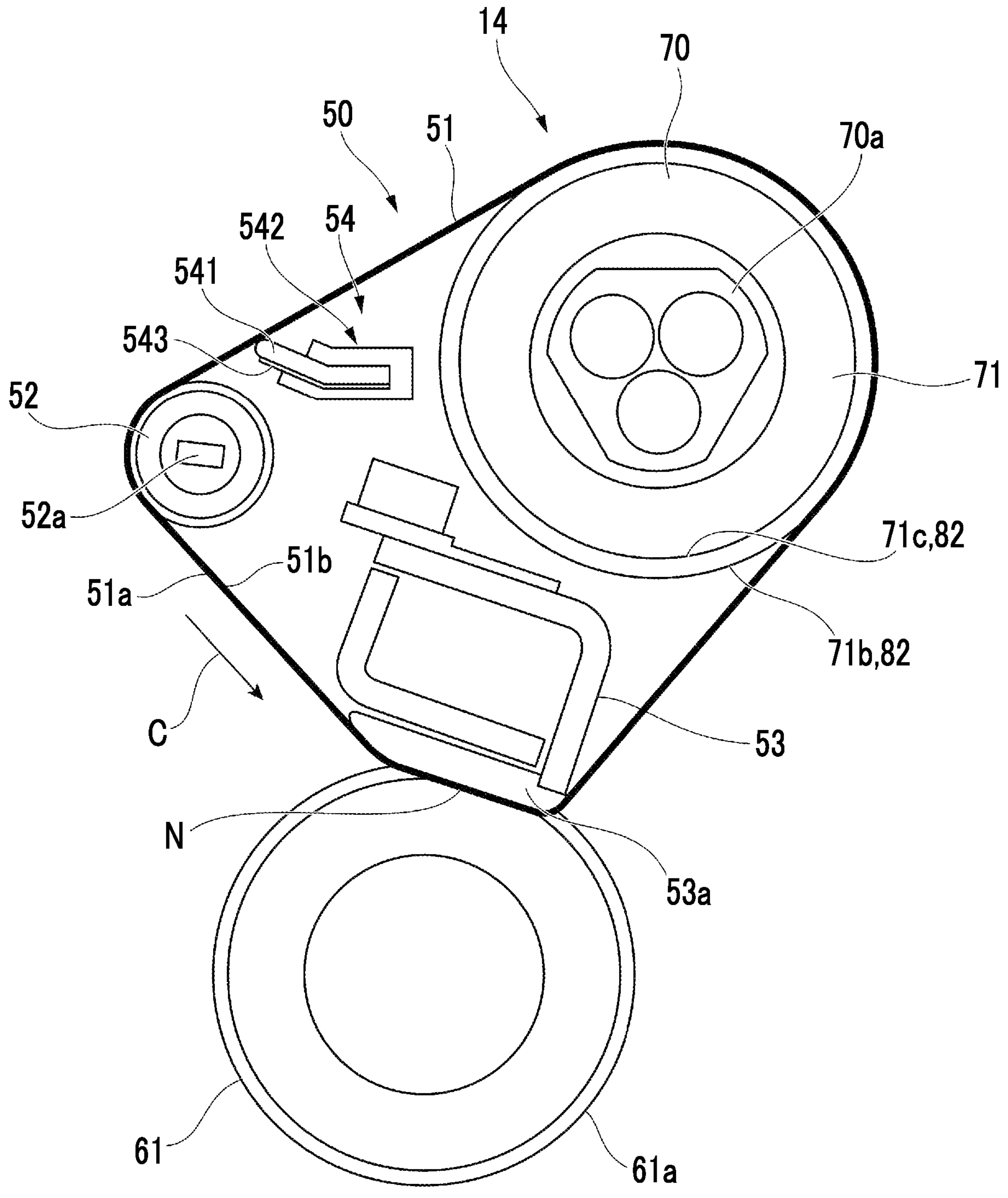
FIG. 2 is a view for describing a configuration of a fixer.

To describe improvement of the nip structure described above, the structure of the pressing portion 53 in the present exemplary embodiment is adopted in view of the necessity of easily peeling the paper P after fixing from a fixing belt 51 (see FIG. 2). For example, in a case where the amount of a toner for a color image is large or the paper P is thin paper, the necessity of adopting a structure making peeling easy increases. However, in a case of the structure in which the pressing portion 53 is provided with the heat generating portion, in general, it is not easy to respond to such a problem of peeling.

In addition, in order for the pressing portion 53 to heat the fixing belt 51, for example, it is preferable to secure a long time for which the fixing belt 51 is in contact with the pressing portion 53. However, in a case of a specification in which high-speed printing is performed in order to increase productivity of the image forming apparatus 1, a circumferential speed of the fixing belt 51 is high. Accordingly, a time for which the fixing belt 51 is in contact with the pressing portion 53 is short, and it is difficult to heat the fixing belt 51 with the heat of the pressing portion 53. Such a contact time also includes a time for which an inner peripheral surface 51*b* of the fixing belt 51 is heated with the heat of the pressing portion 53 and the heat is further transmitted to an outer peripheral surface 51*a* of the fixing belt 51.

In the fixer 14 according to the present exemplary embodiment, in order to shorten a start-up time and secure a heating length with respect to a rotation direction, a configuration where the heat generating portion and a fixing nip portion are separated and the pressing portion 53 is provided with a pad portion 53*a* is adopted. That is, the heat generating portion that generates heat to be transmitted to the fixing belt 51 is provided at a second tension roller 70, and heating to the outer peripheral surface of the fixing belt 51 is performed in a section from the second tension roller 70 to the front of a nip portion N. Accordingly, responding also to the high-speed printing specifications of the image forming apparatus 1 (see FIG. 1) is easier.

In addition, a case of adopting a direct heating structure that directly heats a second tension roller body 71 instead of a heater built-in configuration, in which a heater 70*a* is built in, or together with the heater built-in configuration in the second tension roller 70 is considered. In a case of adopting such a direct heating structure, for example, when a brush is used as an energizing structure energizing the second tension roller body 71, which is a rotating side, from a fixation side, the brush may be worn due to friction or conduction may be insufficient due to accumulation of wear debris, and it is necessary to shorten a component replacement period. On the other hand, in a case where a contact area is decreased to suppress the wear, an appliable current value may decrease. In addition, in a case where sparks are generated at the brush, electrical noise may occur.

In the present exemplary embodiment, the second tension roller 70 includes a power receiving surface that receives power from the fixation side on a peripheral surface and includes a power receiving member that has a spring characteristic biasing the power receiving surface in a direction of the fixation side, and stable electrical conduction is maintained without the occurrence of electrical noise. In other words, the fixing belt 51 has a heat amount at a place other than the nip portion N, and heating is performed at the nip portion with the heat amount.

Hereinafter, description will be made.

FIG. 2 is a view for describing a configuration of the fixer 14.

As shown in FIG. 2, the fixer 14 includes the fixing belt module 50 described above that includes the fixing belt 51, which is an example of a fixing member, and the pressurizing roller 61 described above that is in contact with an outer surface of the fixing belt 51.

The fixing belt module 50 includes a fixing belt 51 described above that circulates and moves in an arrow C direction and a first tension roller 52 that stretches the fixing belt 51 from an inside of the fixing belt 51. In addition, the fixing belt module 50 includes the second tension roller 70 that stretches the fixing belt 51 from the inside on an upstream side of the first tension roller 52 in the arrow C direction. Further, the fixing belt module 50 includes the pressing portion 53 that is positioned on the downstream side of the first tension roller 52 in the arrow C direction and has the pad portion 53*a* for forming the nip portion N by pressing the fixing belt 51 against the pressurizing roller 61.

The nip portion N is formed in the fixer 14 as a part of an outer peripheral surface 61*a* of the pressurizing roller 61 is pressed against the outer peripheral surface 51*a* of the fixing belt 51, which is in contact with the pressing portion 53, from the opposite side to the pressing portion 53. The nip portion N where the outer peripheral surface 61*a* of the pressurizing roller 61 and the fixing belt 51 are in contact with each other is a passing portion through which the paper P on which a toner image is formed passes while being pressurized and heated.

The paper P entering the nip portion N has a toner image forming surface on which a toner image is formed, but the paper P enters the nip portion N in a state where the toner image forming surface faces upward in the present exemplary embodiment. Accordingly, a toner image forming surface side of the paper P comes into contact with the fixing belt 51 in the present exemplary embodiment.

In addition, in the present exemplary embodiment, the pressurizing roller 61 is rotationally driven by the motor (not shown), and the fixing belt 51 circulates and moves, following the pressurizing roller 61. That is, the fixing belt 51 receives a drive force from the rotating pressurizing roller 61 and circulates and moves (circulation movement) in the arrow C direction.

The first tension roller 52 and the second tension roller 70 are rotatably supported and support the fixing belt 51 such that the fixing belt can be circulated and moved as the fixing belt 51 is wound at positions separated from each other. The pressing portion 53 is arranged at a position facing the pressurizing roller 61 with the fixing belt 51 nipped therebetween and presses the fixing belt 51 against the pressurizing roller 61 without rotating. The pressurizing roller 61 includes a layer that can elastically deform to an outer peripheral surface side, and the pressurizing roller 61 is in a shape recessed at the nip portion N as the pressing portion 53 is in contact therewith via the fixing belt 51. In the present exemplary embodiment, the paper P is nipped from both sides by the pressurizing roller 61 and the pressing portion 53, and a pressure is applied to the paper P.

Inside the first tension roller 52, a heater 52*a* is provided. In addition, the heater 70*a* is provided inside the second tension roller 70. The heaters 52*a* and 70*a* are configured by, for example, halogen heaters. The first tension roller 52 is heated by the heat of the heater 52*a*, and the second tension roller 70 is heated by the heat of the heater 70*a*. Then, the fixing belt 51 is heated by the heat from the first tension roller 52 and the second tension roller 70.

The second tension roller 70 has the tubular second tension roller body 71 built in the heater 70*a* described above. An outer peripheral surface 71*b*, which is an example of a contact surface, of the second tension roller body 71, which is an example of a rotating member, is in contact with the inner peripheral surface 51*b* of the fixing belt 51.

To describe further, the second tension roller 70 of the present exemplary embodiment has, in addition to the heater 70*a* described above, an outer peripheral surface heat generating layer 81, which is an example of a heat generating portion formed over the entire periphery of the outer peripheral surface 71*b* of the second tension roller body 71, and an inner peripheral surface heat generating layer 82, which is an example of a heat generating portion formed over the entire periphery of an inner peripheral surface 71*c*.

Such heat generating layers 81 and 82 are the heat generating portions formed as layers over the peripheral surface of the second tension roller body 71 and are formed by coating a substance generating heat with Joule heat in a case where a current flows. In addition, a modification example in which there are a portion where the heat generating portion is formed and a portion where the heat generating portion is not formed related to a direction along the peripheral surface of the second tension roller body 71 is also considered.

The heat generating layers 81 and 82 are formed in a longitudinal direction or an axial direction of the second tension roller body 71.

In the example shown in FIG. 2, the fixing belt 51 is wound around a section of approximately half of the circumference of the outer peripheral surface 71*b* of the second tension roller body 71, and the fixing belt 51 can secure a relatively long time of being in contact with the outer peripheral surface 71*b*.

As described above, the second tension roller 70 of the present exemplary embodiment adopts a resistance heat generating roller configuration for shortening the start-up time and securing a heating length with respect to the rotation direction. To describe further, the second tension roller 70 applies, together with the heater 70*a*, a heat amount to the fixing belt 51 with the outer peripheral surface heat generating layer 81 and the inner peripheral surface heat generating layer 82.

For example, approximately 12 A of current is supplied to the outer peripheral surface heat generating layer 81 and the inner peripheral surface heat generating layer 82 of the second tension roller 70. The second tension roller 70 may adopt a configuration of not including the heater 70*a* while including the outer peripheral surface heat generating layer 81 and the inner peripheral surface heat generating layer 82.

The fixing belt module 50 includes a liquid applying device 54 that applies an oil to an inner surface of the fixing belt 51 between the first tension roller 52 and the second tension roller 70. The liquid applying device 54 includes an oil impregnating member 541 that is in contact with the inner surface of the fixing belt 51, a casing 542 that holds the oil impregnating member, and a support member 543 that supports a part including a tip of the oil impregnating member from an opposite side to the fixing belt 51.

The oil impregnating member 541 is formed by a non-woven fabric formed of heat-resistant fibers being soaked with an oil. For example, polytetrafluoroethylene (PTFE) is used for the heat-resistant fibers. As the oil is applied to the inner peripheral surface 51*b* of the fixing belt 51 by the oil impregnating member 541, the coefficient of friction between the pressing portion 53 and the fixing belt 51 decreases, and the wear of the fixing belt 51 is suppressed.

Figure 3:
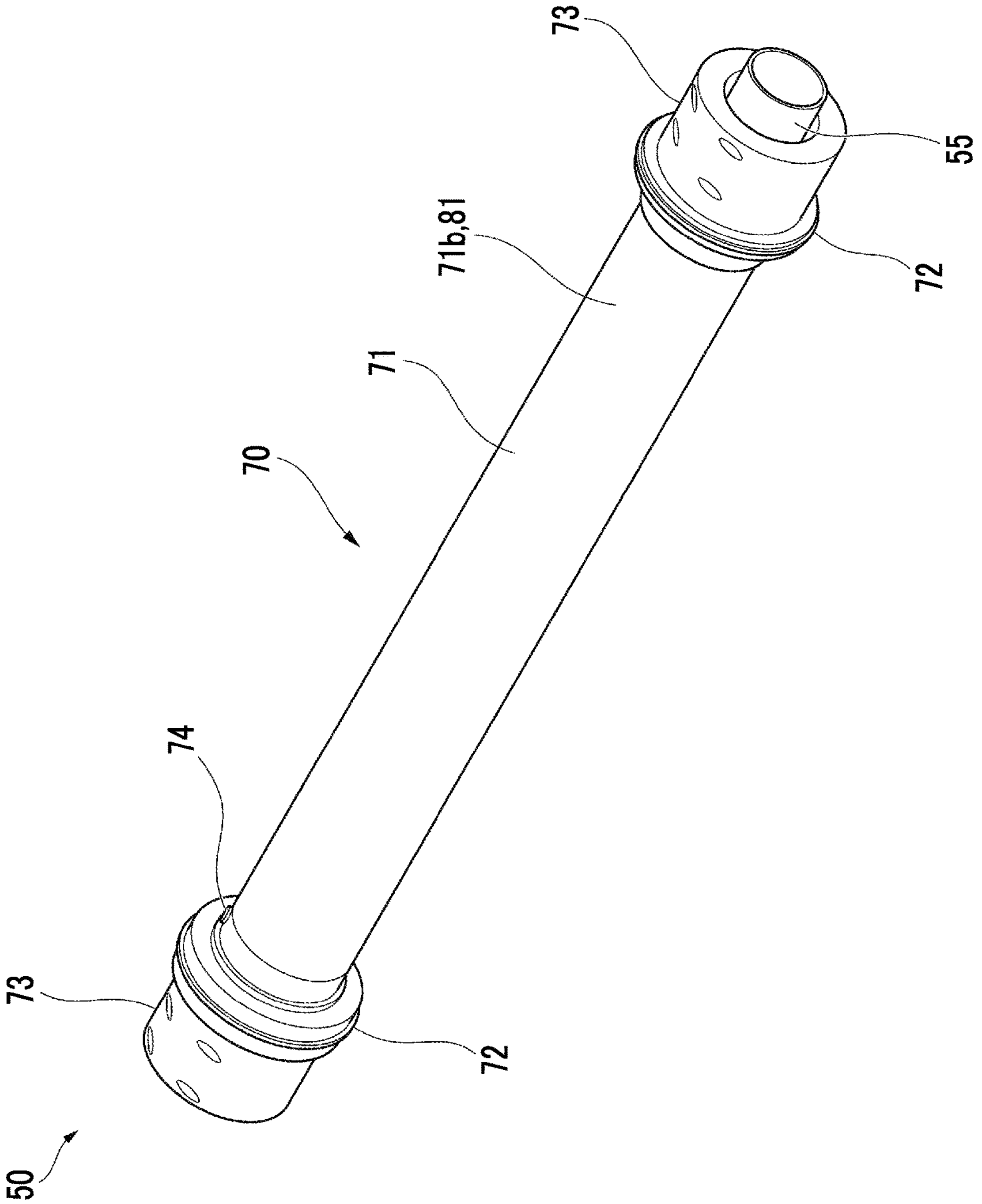
FIG. 3 is a perspective view for describing a holding structure of a second tension roller.

FIG. 3 is a perspective view for describing a holding structure of the second tension roller 70. Herein, the holding structure means a structure in which the second tension roller 70 is attached and held by the image forming apparatus 1 (see FIG. 1).

As shown in FIG. 3, the second tension roller 70 includes the second tension roller body 71 described above, the outer peripheral surface heat generating layer 81 described above, that is formed at the outer peripheral surface 71*b*, which is an intermediate portion of the second tension roller body 71, and the inner peripheral surface heat generating layer 82 (for example, see FIG. 2) described above, that is formed at the inner peripheral surface 71*c* of the second tension roller body 71, which is a surface on an opposite side to the outer peripheral surface heat generating layer 81.

In addition, the second tension roller 70 includes a flange portion 72 and a rotating electrode portion 73 that are arranged at each of end portions of the second tension roller body 71.

The flange portion 72 is for holding the second tension roller 70 by positioning the second tension roller 70 in the longitudinal direction of the second tension roller 70 in a case of being attached to the image forming apparatus 1 (holding structure). The outer peripheral surface heat generating layer 81 is provided in a section sandwiched between a pair of flange portions 72.

The rotating electrode portion 73 of the second tension roller 70 is arranged on an end portion side of the flange portion 72 and is connected to a fixation side energizing member 55 which is an example of a fixation member fixed to an apparatus body of the image forming apparatus 1 (see FIG. 1).

The second tension roller body 71, the flange portion 72, and the rotating electrode portion 73 are integrally assembled into the second tension roller 70. That is, the flange portion 72 and the rotating electrode portion 73 are assembled integrally with the second tension roller body 71. For this reason, in a case where the second tension roller body 71 of the second tension roller 70 rotates with respect to the fixation side energizing member 55, the flange portion 72 and the rotating electrode portion 73 also rotate the same with respect to the fixation side energizing member 55.

As described above, the second tension roller 70 is rotatable with respect to the fixation side energizing member 55.

Power applied to the outer peripheral surface heat generating layer 81 and the inner peripheral surface heat generating layer 82 of the second tension roller body 71 is supplied from the apparatus body of the image forming apparatus 1 to the fixation side energizing member 55.

Hereinafter, description will be made.

Figure 4:
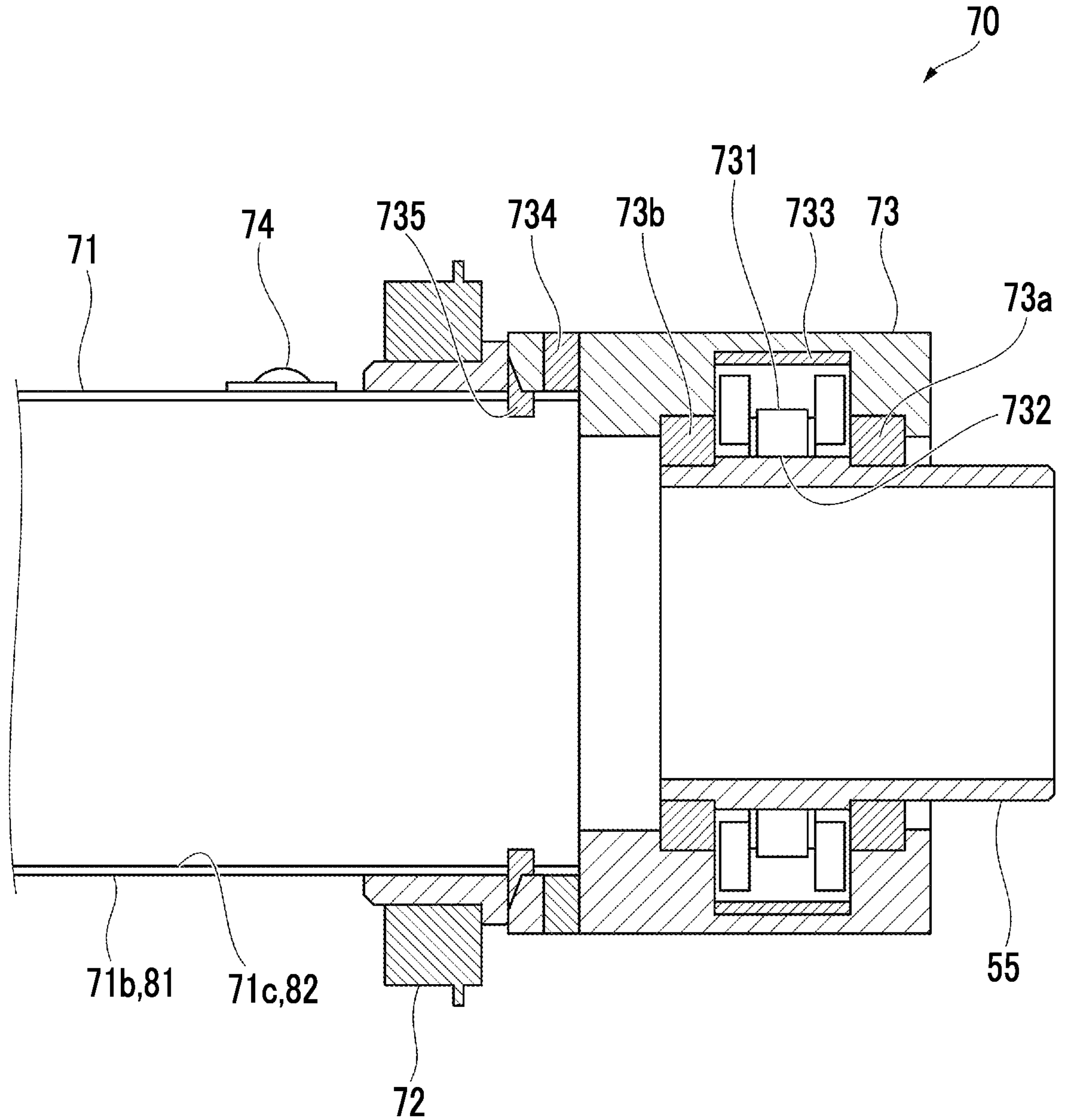
FIG. 4 is a cross-sectional view for describing a structure of an end portion of the second tension roller.
Figure 5:
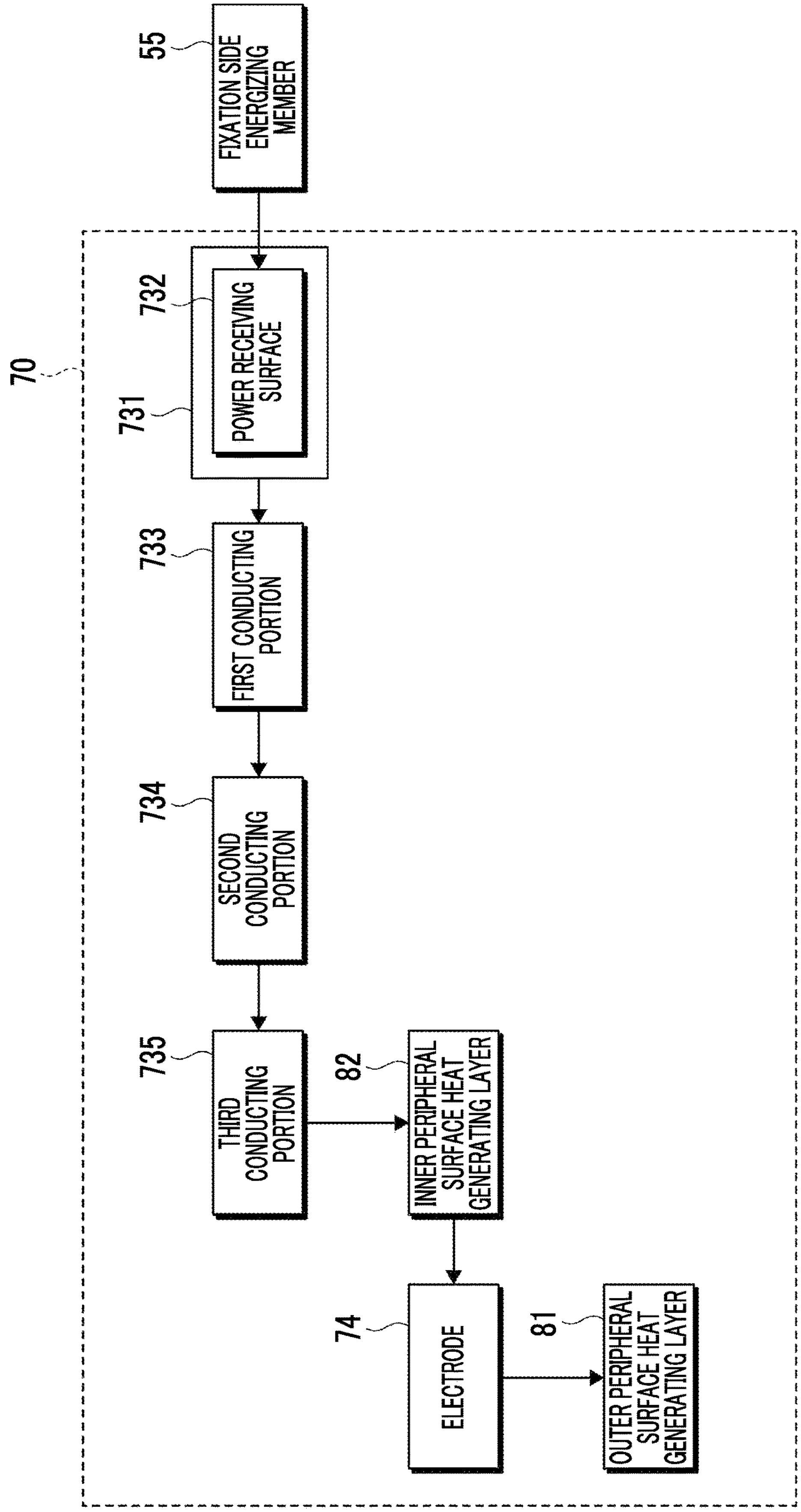
FIG. 5 is a block diagram for describing a conduction path in the end portion of the second tension roller.

FIGS. 4 and 5 are views for describing a configuration of the second tension roller 70. More specifically, FIG. 4 is a cross-sectional view for describing a structure of an end portion of the second tension roller 70, and FIG. 5 is a block diagram for describing a conduction path in the end portion of the second tension roller 70. In addition, FIGS. 4 and 5 show a voltage application structure. Herein, the voltage application structure means a structure for applying a voltage to the outer peripheral surface heat generating layer 81 and the inner peripheral surface heat generating layer 82 (see FIG. 2) of the second tension roller 70.

As shown in FIG. 4, the rotating electrode portion 73 includes a ring-shaped annular member 731 arranged in a space for receiving the fixation side energizing member 55. The annular member 731 is an example of the power receiving member rotating together with the second tension roller body 71.

Such an annular member 731 is a wide member and is formed of a copper alloy, which is an alloy mostly made of copper. Herein, the copper alloy is, for example, titanium copper and beryllium copper. Titanium copper has a characteristic of having low wear resistance. On the other hand, for example, beryllium copper is more preferable than titanium copper in that beryllium copper has characteristics of high strength, less sparks, and low friction. Beryllium copper is an alloy obtained by adding beryllium in a range of, for example, 0.5 to 3% to copper.

In addition, the annular member 731 is a copper alloy member having a spring characteristic in a radial direction. The annular member 731 can have such a spring characteristic by adjusting a thickness and a size in the radial direction. As described above, the annular member 731 has a spring characteristic of biasing in a direction of the fixation side energizing member 55.

The annular member 731 of the present exemplary embodiment is an endless member, but without being limited thereto, may be an ended member, that is, a member having an end portion which has a notch or is spirally formed.

The annular member 731 has a power receiving surface 732 that can be connected to an outer peripheral surface of the fixation side energizing member 55 received by the space of the rotating electrode portion 73. Such a power receiving surface 732 can receive power from the fixation side energizing member 55 with a peripheral surface. The power receiving surface 732 is an inner peripheral surface of the annular member 731 and is wide.

Therefore, a voltage is applied to the second tension roller body 71 of the rotating second tension roller 70 via the power receiving surface 732 of the annular member 731 that slides on the outer peripheral surface of the fixation side energizing member 55. That is, a voltage is applied from the fixation side to the rotating side in the present exemplary embodiment, for example, in a contact area wider than a case of the brush. In addition, since the annular member 731 has a spring characteristic, contact with the fixation side energizing member 55 is more reliably performed.

As described above, in the present exemplary embodiment, the annular member 731 has the power receiving surface 732 receiving power with the peripheral surface and has a spring characteristic of biasing in the direction of the fixation side energizing member 55. For this reason, the occurrence of defects which are problems from the related art, such as, conduction failure, necessity of component replacement work in a short period of time, the occurrence of electrical noise, and a decrease in an appliable current value, which are caused by wear attributable to friction, is suppressed.

Positioning members 73*a* and 73*b* position the fixation side energizing member 55 in an axial direction (right-left direction in FIG. 4) with respect to the annular member 731.

The voltage application structure will be further described.

As described in FIG. 4, the rotating electrode portion 73 has a first conducting portion 733 electrically connected to the power receiving surface 732. The first conducting portion 733 is formed at a bottom portion of a groove portion that is connected to the space for receiving the fixation side energizing member 55 and extends in a circumferential direction.

In addition, the rotating electrode portion 73 has a second conducting portion 734 electrically connected to the first conducting portion 733 and a third conducting portion 735 that is electrically connected to the second conducting portion 734, passes through the second tension roller body 71, and leads power from an outer peripheral surface 71*b* side to an inner peripheral surface 71*c* side.

Accordingly, a voltage is applied to the inner peripheral surface heat generating layer 82 on the inner peripheral surface 71*c* side of the second tension roller body 71.

To describe further, the second tension roller body 71 is provided with an electrode 74 that is positioned closer to the intermediate portion than the flange portion 72 is and that is for electrically connecting the outer peripheral surface 71*b* and the inner peripheral surface 71*c* to each other. Accordingly, a voltage is applied to the outer peripheral surface heat generating layer 81 on the outer peripheral surface 71*b* side of the second tension roller body 71.

As described above, the conduction path from the fixation side energizing member 55 to the outer peripheral surface heat generating layer 81 and the inner peripheral surface heat generating layer 82 of the second tension roller 70 is formed. To describe such a conduction path again, as shown in FIG. 5, a voltage is applied from the fixation side energizing member 55 to the power receiving surface 732 of the annular member 731. Then, the voltage is applied from the annular member 731 to the inner peripheral surface heat generating layer 82 via the first conducting portion 733, the second conducting portion 734, and the third conducting portion 735. Further, the voltage is also applied from the inner peripheral surface heat generating layer 82 to the outer peripheral surface heat generating layer 81 via the electrode 74.

Although the present exemplary embodiment has been described hereinbefore, a modification example will also be considered.

Figure 6:
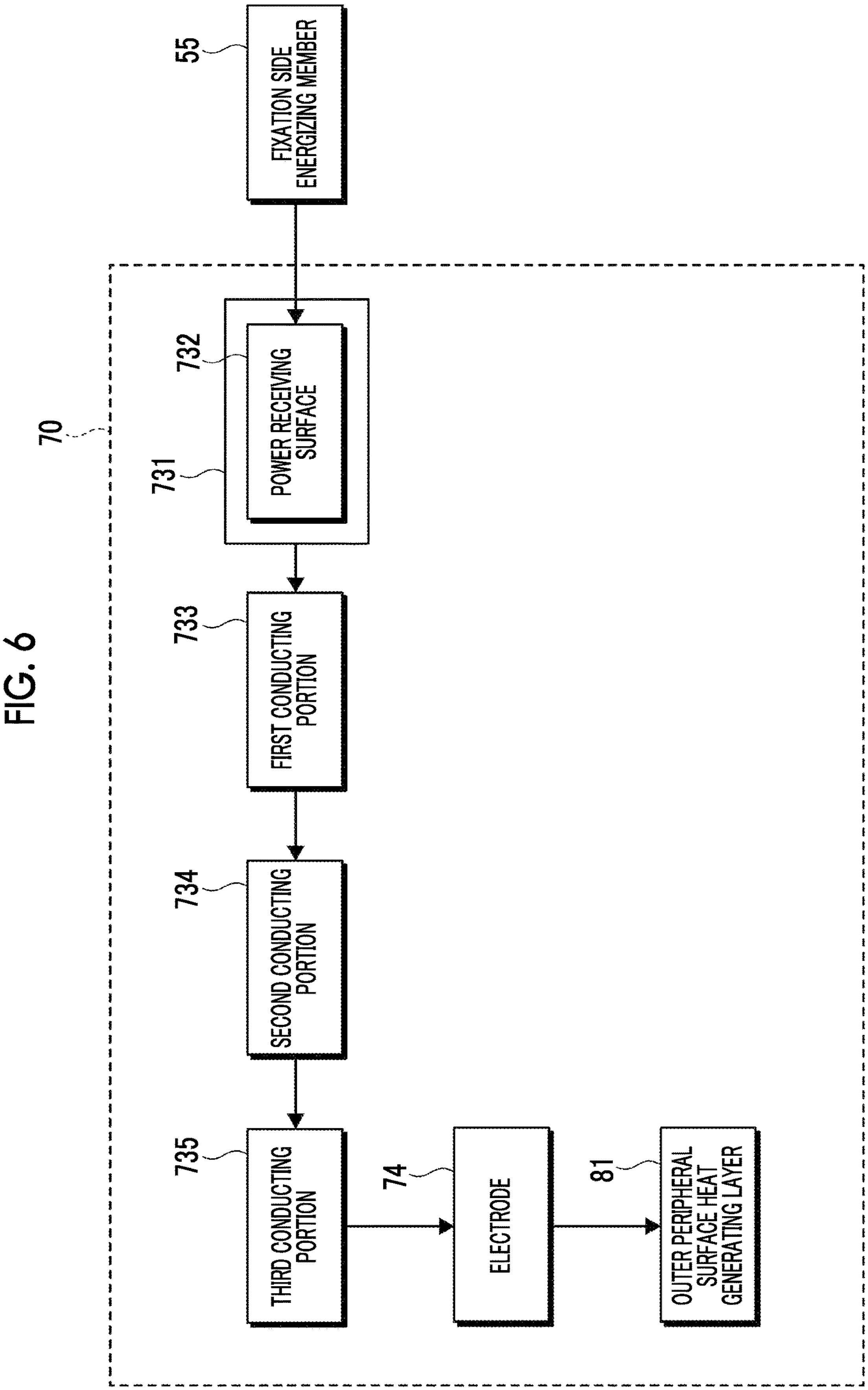
FIG. 6 is a block diagram for describing a conduction path in an end portion of a second tension roller in a modification example.

FIG. 6 is a block diagram for describing a conduction path in the end portion of the second tension roller 70 in the modification example and corresponds to FIG. 5. Such a modification example is a configuration where the inner peripheral surface heat generating layer 82 is not included among the outer peripheral surface heat generating layer 81 and the inner peripheral surface heat generating layer 82 included in the present exemplary embodiment. Since other configurations are the same, description and illustration thereof will be omitted.

As shown in FIG. 6, in the conduction path according to the modification example, a voltage is applied from the fixation side energizing member 55 to the power receiving surface 732 of the annular member 731 and is further applied to the outer peripheral surface heat generating layer 81 via the first conducting portion 733, the second conducting portion 734, the third conducting portion 735, and the electrode 74.

In addition, as another modification example, the second tension roller 70 may be configured such that the inner peripheral surface heat generating layer 82 is included among the outer peripheral surface heat generating layer 81 and the inner peripheral surface heat generating layer 82 while the outer peripheral surface heat generating layer 81 is not included.

The conduction path according to the present exemplary embodiment and the modification example may also be considered to be configured as another path and be configured by using, for example, a wire rod such as a wire. Such a conduction path may be configured by using another well-known conventional technique.

In addition, the conduction path according to the present exemplary embodiment and the modification example is for applying a voltage to the outer peripheral surface heat generating layer 81 or the inner peripheral surface heat generating layer 82 of the second tension roller 70, but application of a voltage to the heater 70*a* (see FIG. 2) built in the second tension roller 70 may be performed.

As described above, since voltage application from the fixation side to a moving side adopts a configuration where the power receiving surface 732 of the annular member 731 is biased in the direction of the fixation side energizing member 55 due to a spring characteristic of the annular member 731 in the present exemplary embodiment or the modification example, stable conduction is secured and long life and high reliability of a component are further achieved.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A fixing device comprising:

a fixation member;

a fixing member that has an outer peripheral surface and an inner peripheral surface, is rotatably provided with respect to the fixation member, comes into contact with, of a recording material on which an image is formed, a surface on which the image is formed, and fixes the image to the recording material;

a rotating member that includes a contact surface, which is in contact with the inner peripheral surface of the fixing member, at an outer peripheral portion, includes a heat generating portion generating heat due to electric resistance, and is rotatable together with the heat generating portion with respect to the fixation member; and a power receiving member that includes a power receiving surface receiving power from the fixation member with a peripheral surface, has a spring characteristic of biasing the power receiving surface in a radial direction of the fixation member, and rotates together with the rotating member.

2. The fixing device according to claim 1,
wherein the power receiving member is made of a copper alloy that has the spring characteristic.

3. The fixing device according to claim 2,
wherein the copper alloy is beryllium copper.

4. The fixing device according to claim 1,
wherein the power receiving member is an endless member.

5. The fixing device according to claim 1,
wherein the power receiving member is a member having an end portion.

6. The fixing device according to claim 1,
wherein the heat generating portion of the rotating member is formed as a layer over a peripheral surface of the rotating member.

7. The fixing device according to claim 6,
wherein the heat generating portion, which is the layer, is formed at an outer peripheral surface and an inner peripheral surface of the rotating member.

8. An image forming apparatus comprising:
an image forming portion that forms an image on a recording material;
a fixation member;
a fixing member that has an outer peripheral surface and an inner peripheral surface, is rotatably provided with respect to the fixation member, comes into contact with, of the recording material on which the image is formed, a surface on which the image is formed, and fixes the image to the recording material;
a rotating member that includes a contact surface, which is in contact with the inner peripheral surface of the fixing member, at an outer peripheral portion, includes a heat generating portion generating heat due to electric resistance, and is rotatable together with the heat generating portion with respect to the fixation member; and
a power receiving member that includes a power receiving surface which receives power from the fixation member with a peripheral surface, has a spring characteristic of biasing the power receiving surface in a radial direction of the fixation member, and rotates together with the rotating member.

* * * * *